(12) United States Patent
Hoglund

(10) Patent No.: US 9,361,364 B2
(45) Date of Patent: *Jun. 7, 2016

(54) UNIVERSAL DATA RELATIONSHIP INFERENCE ENGINE

(75) Inventor: Thomas W. Hoglund, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1417 days.

This patent is subject to a terminal disclaimer.

(21) Appl. No.: 11/489,962

(22) Filed: Jul. 20, 2006

(65) Prior Publication Data

US 2008/0021898 A1    Jan. 24, 2008

(51) Int. Cl.
*G06F 7/00* (2006.01)
*G06F 17/30* (2006.01)
*G06F 12/00* (2006.01)

(52) U.S. Cl.
CPC .................. *G06F 17/30657* (2013.01)

(58) Field of Classification Search
USPC .............................................................. 707/6
See application file for complete search history.

(56) References Cited

U.S. PATENT DOCUMENTS

| | | | |
|---|---|---|---|
| 6,601,075 B1 * | 7/2003 | Huang et al. .................. 707/748 |
| 6,778,979 B2 * | 8/2004 | Grefenstette et al. | |
| 7,043,492 B1 * | 5/2006 | Neal et al. | |
| 2003/0050959 A1 * | 3/2003 | Faybishenko et al. ......... 709/202 |
| 2005/0033771 A1 * | 2/2005 | Schmitter et al. .......... 707/104.1 |
| 2005/0065909 A1 * | 3/2005 | Musgrove et al. ................. 707/2 |
| 2005/0160082 A1 * | 7/2005 | Dawson ............. 707/3 |
| 2005/0216186 A1 * | 9/2005 | Dorfman et al. .............. 701/207 |
| 2005/0222981 A1 * | 10/2005 | Lawrence et al. .................. 707/3 |
| 2005/0289142 A1 * | 12/2005 | Adams ............................... 707/6 |
| 2005/0289168 A1 * | 12/2005 | Green et al. .................. 707/101 |
| 2006/0004752 A1 * | 1/2006 | Harel et al. ........................ 707/6 |
| 2006/0004753 A1 * | 1/2006 | Coifman et al. ................... 707/6 |
| 2006/0015494 A1 * | 1/2006 | Keating et al. ..................... 707/6 |
| 2006/0015495 A1 * | 1/2006 | Keating et al. ..................... 707/6 |
| 2006/0020597 A1 * | 1/2006 | Keating et al. ..................... 707/6 |
| 2006/0047656 A1 * | 3/2006 | Dehlinger et al. ................. 707/6 |
| 2006/0059028 A1 * | 3/2006 | Eder ................................. 705/7 |
| 2006/0064415 A1 * | 3/2006 | Guyon et al. ...................... 707/6 |
| 2006/0085416 A1 * | 4/2006 | Naoi et al. ........................ 707/6 |
| 2006/0095345 A1 * | 5/2006 | Ka et al. ......................... 705/27 |
| 2006/0122994 A1 * | 6/2006 | Kapur et al. ...................... 707/4 |

OTHER PUBLICATIONS

Soumen Chakrabarti; Enhanced Topic Distillation using Text, Markup Tags, and Hyperlinks; 2001; ACM; pp. 208-216.*
N. Popp; Context and Goals for Common Name Resolution; 2000; ip.com; pp. 1-11.*
Office Action, dated Jun. 24, 2011, for U.S. Appl. No. 12/913,915, filed Oct. 28, 2010 (28 pages).

* cited by examiner

*Primary Examiner* — Mariela Reyes
*Assistant Examiner* — Jermaine Mincey
(74) *Attorney, Agent, or Firm* — Harrity & Harrity, LLP

(57) ABSTRACT

While a user is viewing content on a computer display, the universal data relationship inference engine presents related information from disparate data sources. A normalized index is maintained that indexes content to a set of standard taxonomy terms. The inference engine parses content being viewed by the user. If the content includes tags for some of the standard taxonomy terms, then the system may provide the user with the ability to view the related content that is indexed by the normalized index. If there are not taxonomy tags then the system may attempt to recognize non-standard taxonomy terms in the content in order to provide the user with related content. The inference engine may also identify related content by identifying synonyms to the taxonomy terms.

13 Claims, 5 Drawing Sheets

Search for:
Keyword(s): [_____]
and content type [Experts ▽] and
    Subtype [Company ▽] contains [Vodafone ▽] or
    Subtype [Process ▽] contains [Sales ▽]
and content rating at least ★★★ ▽
and date authored after [01-01-2004] and before [_____]
            mm-dd-yyyy              mm-dd-yyyy Results sorted by [Content rating ▽] then by [Location ▽]   [Search]

Search results:

| Result | Rating | Location | Type | Subtype |
|---|---|---|---|---|
| James Smith | ★★★★★ | Chicago | Experts | Sales process |
| Sarah Martin | ★★★★ | London | Experts | Company |
| Erica Bayou | ★★★★ | London | Experts | Sales process |
| David Smith | ★★★ | Hartford | Experts | Company |
| Olivier Fusil | ★★★ | London | Experts | Company |
| Tim Ringo | ★★★ | Paris | Experts | Sales process |

Fig. 5

UNIVERSAL DATA RELATIONSHIP INFERENCE ENGINE

BACKGROUND OF THE INVENTION

It is often a goal of a business to have its employees perform their daily work at a higher level. For example, a business may desire that its sales force, call center representatives, or professional services representatives be more effective in their day-to-day business activities. One way to boost human performance is to provide people the information they need to do their jobs. Such information may include training, access to experts on specific topics, sample work products or other knowledge that is pertinent to helping the employee do his or her job.

For example, a computer system may allow a call center representative to perform a search on support materials. Or the system may allow the call center representative access to a trouble ticket system for the purpose of discovering how similar problems have been solved in the past. Providing access to support materials is not without its problems. A company may have its content on too many different systems. This then requires a computer user looking for an answer to search each system individually. Or, a company may have its content stored in an unorganized fashion. While an answer may exist, the user may be unable to find the answer among the unorganized materials. Or the user may not know how to properly navigate the computer system to find the information he or she needs or may not know how to formulate an effective query to search for the information. These and other problems can prevent people from performing at a higher level.

SUMMARY OF THE INVENTION

While a user is viewing content on a computer display, the universal data relationship inference engine may present related information from disparate data sources. A normalized index may be maintained that indexes content to a set of standard taxonomy terms. The inference engine may parse content being viewed by the user. If the content includes tags for some of the standard taxonomy terms, then the system may provide the user with the ability to view the related content that is indexed by the normalized index. If there are not standard taxonomy tags, then the system may attempt to recognize non-standard tags in the content or derive standard tags in order to provide the user with related content. The inference engine may also identify related content by identifying synonyms to the taxonomy terms.

It is an objective of the invention to provide computer system users with the ability to leverage content that is relevant to the user's task at hand. It is another objective of the invention to provide highly relevant related information to a computer user. It is yet another objective of the invention to provide related content in near proximity to the task being handled by a computer user. These and other objectives are realized by embodiments of the present invention.

BRIEF DESCRIPTION OF THE DRAWINGS

FIG. 5 is a schematic diagram of a feature of the present invention that, in the example, is accessible from the computer application of FIG. 2.

DETAILED DESCRIPTION OF THE INVENTION

Figure 1:
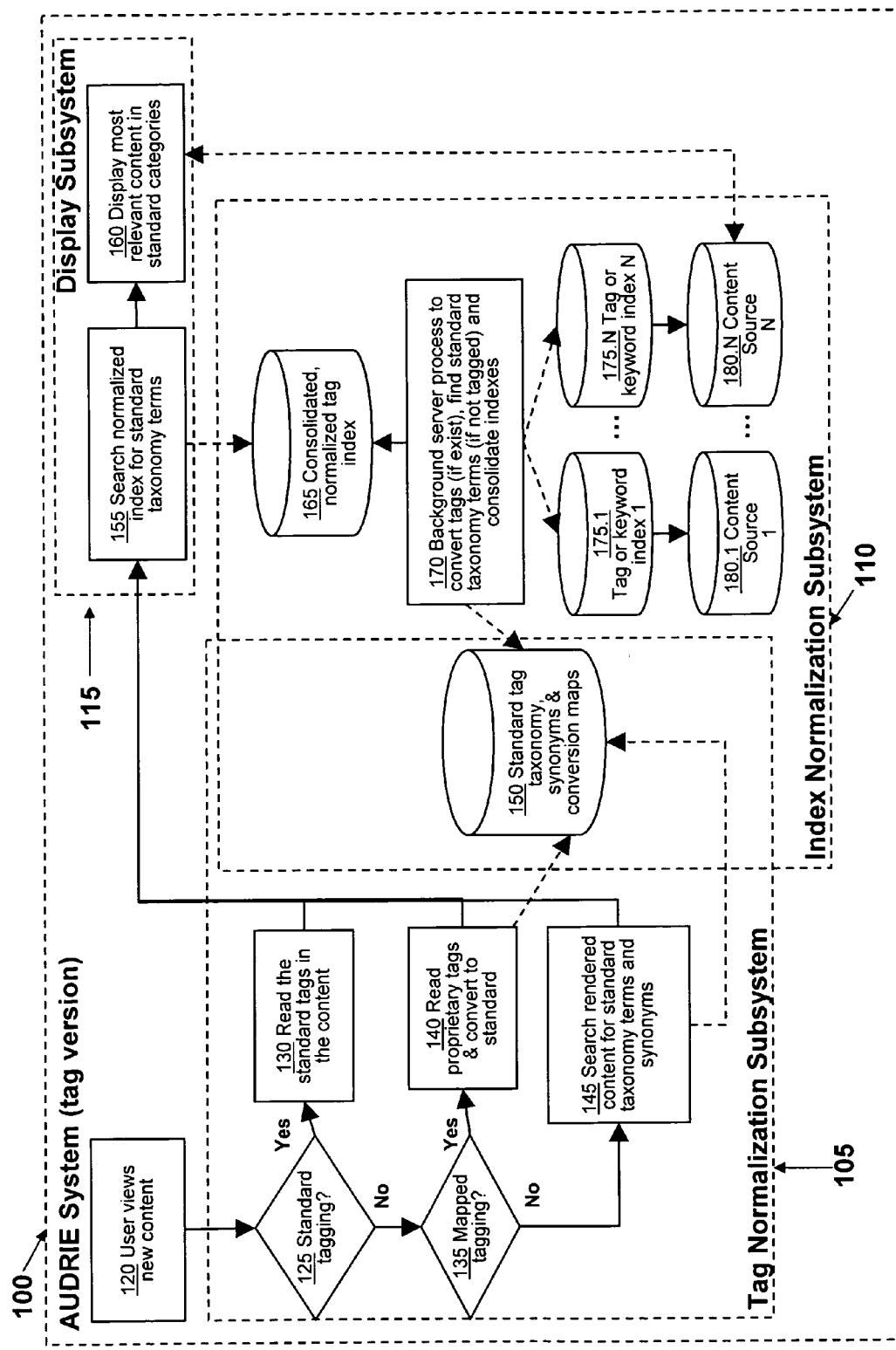
FIG. 1 is a flowchart of one embodiment of the present invention.

Aspects of the invention may be embodied in "A Universal Data Relationship Inference Engine" system, which is also referred to as the AUDRIE system for short. FIG. 1 is a flowchart that maps the major system components in one embodiment of the AUDRIE system 100. As can be seen in FIG. 1, this embodiment of AUDRIE includes three subsystems, namely, the tag normalization subsystem 105, the index normalization subsystem 110 and the display subsystem 115.

Figure 2:
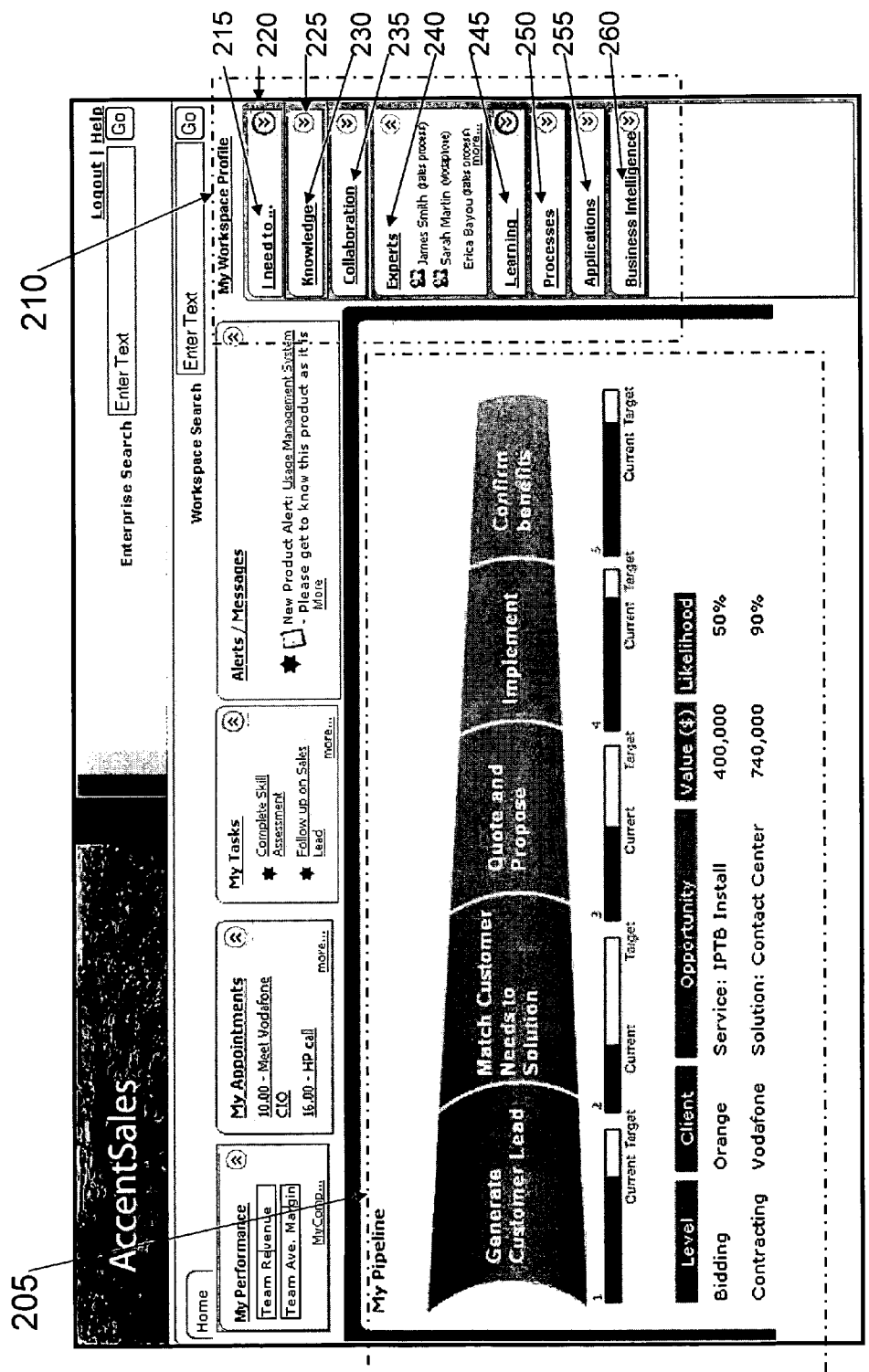
FIG. 2 is a screen shot of a computer application in use by a computer user.

FIG. 2 is a screen shot showing a primary computer application 205 as well as reference support offered by AUDRIE 210 (shown within the dashed lines). The flowchart of FIG. 1 can be explained through reference to this screen shot.

In step 120, a computer user may view new content. This content may be displayed while the user is accessing a web site, while she is running a software application (such as is shown in FIG. 2), etc. The content being viewed 205 drives what reference support is offered by AUDRIE 210. In one embodiment of the invention, AUDRIE reacts to three content scenarios. In the first scenario, the displayed content may be identified as content that has already been tagged via a standard taxonomy that is recognizable by the AUDRIE system. In the second scenario, the displayed content may be managed by another application that has its own taxonomy, such taxonomy already having been mapped to AUDRIE's standard taxonomy. In the third scenario, the viewed content may contain no tags or may be tagged with an unknown taxonomy. In this case, AUDRIE reads the content to discover which of the standard taxonomy terms (or synonyms to terms) are contained in the content.

These three scenarios are handled in steps 125-145, which make up AUDRIE's Tag Normalization subsystem. In the embodiment shown in FIG. 1, AUDRIE first determines whether the content is tagged using a recognized, standard taxonomy (step 125). If so, then AUDRIE may parse the standard tags in the content (step 130). If there are not standard tags, AUDRIE determines whether the content is based on a taxonomy that has been previously mapped (step 135). If so, then AUDRIE may read the content's tags and use a database 150 to convert them to the mapped standard tags (step 140). If the content does not follow a standard taxonomy and if the content also does not include tags for which a known mapping exists, then AUDRIE reads the content for standard taxonomy terms and synonyms (step 145). Reading screens for content is well known in the art. For example, for web site content, it is well known that a computer program can be designed to parse the underlying HTML code.

Through these three scenarios, AUDRIE's Tag Normalization subsystem 105 compiles a list of normalized tags representing the type of content being displayed to the user. AUDRIE's Display subsystem 115 handles retrieving reference materials related to the content and presenting these reference materials to the user. At step 155, AUDRIE searches a normalized index for the normalized tags for the current content to determine which reference materials may be related to the content that the user is viewing. Although AUDRIE could present all of these reference materials to the user, in one embodiment, AUDRIE deduces which subset of the materials might be most relevant to the displayed content and displays it in standard categories (step 160). Then only this most relevant reference material is made available to the user.

Element 210 of FIG. 2 shows one embodiment of a toolbar provided for by AUDRIE. As shown, AUDRIE provides the user access to various types of relevant content. Based on the content being viewed 205, a set of relevant tasks may be presented 215 (such as wanting to set up a new customer, wanting to complete a skill assessment, etc.). Relevant knowledge reference materials 230 may also be available. AUDRIE may also enable access to relevant collaboration materials 235 or relevant experts 240. The user may have access to relevant training 245 or to materials that support a relevant business process 250. Other relevant computer applications 255 as well as business intelligence 260 may be made available through AUDRIE. Of course, these types of reference materials are some of the many types that can be supported by AUDRIE.

The AUDRIE toolbar 210 may be configured to collapse and expand categories of reference materials to save screen real estate. In the example shown in FIG. 2, reference categories for which AUDRIE has determined relevant content may have blinking indicators 220 while blank categories have non-blinking indicators 225. By clicking on one of the blinking indicators 220, the user is able to expand the category from just the heading to the actual content within. For example, under the Experts category, FIG. 2 shows that AUDRIE has determined that James Smith, Sarah Martin and Erica Bayou can be contacted for expertise regarding the type of content currently being displayed 205. AUDRIE may enable additional reference materials to be presented or searched. In FIG. 2, each category expanded with content includes a "More" link. For example, in the Experts category, the user may click on this "More" link to access a search feature shown in FIG. 5. This enables the user to find reference materials that are outside of the short list of items displayed in the AUDRIE toolbar. For example, here the user is able to search for experts based on specific qualifications, such as a company or sales process.

As has now been explained, AUDRIE's Tag Normalization subsystem 105 determines the type of content being displayed to the user based on certain tags. AUDRIE's Display subsystem 115 searches for the tags in a normalized index in order to present the most relevant reference materials to the user. AUDRIE's Index Normalization subsystem 110, which builds and maintains this normalized index will now be described.

Reference materials may be stored in a series of content sources 180. For example, as FIG. 3 explains, in order to populate the Experts category 240, AUDRIE may rely on such content sources 180 as a company's HR employee directory 305, a database of CVs/resumes for the employees 310 and a skills database 315. In the embodiment shown in FIG. 1, AUDRIE creates an index 175 for each of these content sources. The index may be based on keywords or tags in the content sources. AUDRIE may have a background process 170 that builds these indexes 175. Much like identifying the type of content being displayed to the user, to build the indices this background process 170 may search the content sources 180 for standard tagging or for tagging that has been mapped to the standard tags. The process 170 may also look for standard taxonomy terms or synonyms of these terms in the content sources. Each content source index 175 may be combined to form a consolidated index 165. It is this consolidated index that AUDRIE's Display subsystem 115 may search to determine the relevant reference materials to make available to the user.

Figure 3:
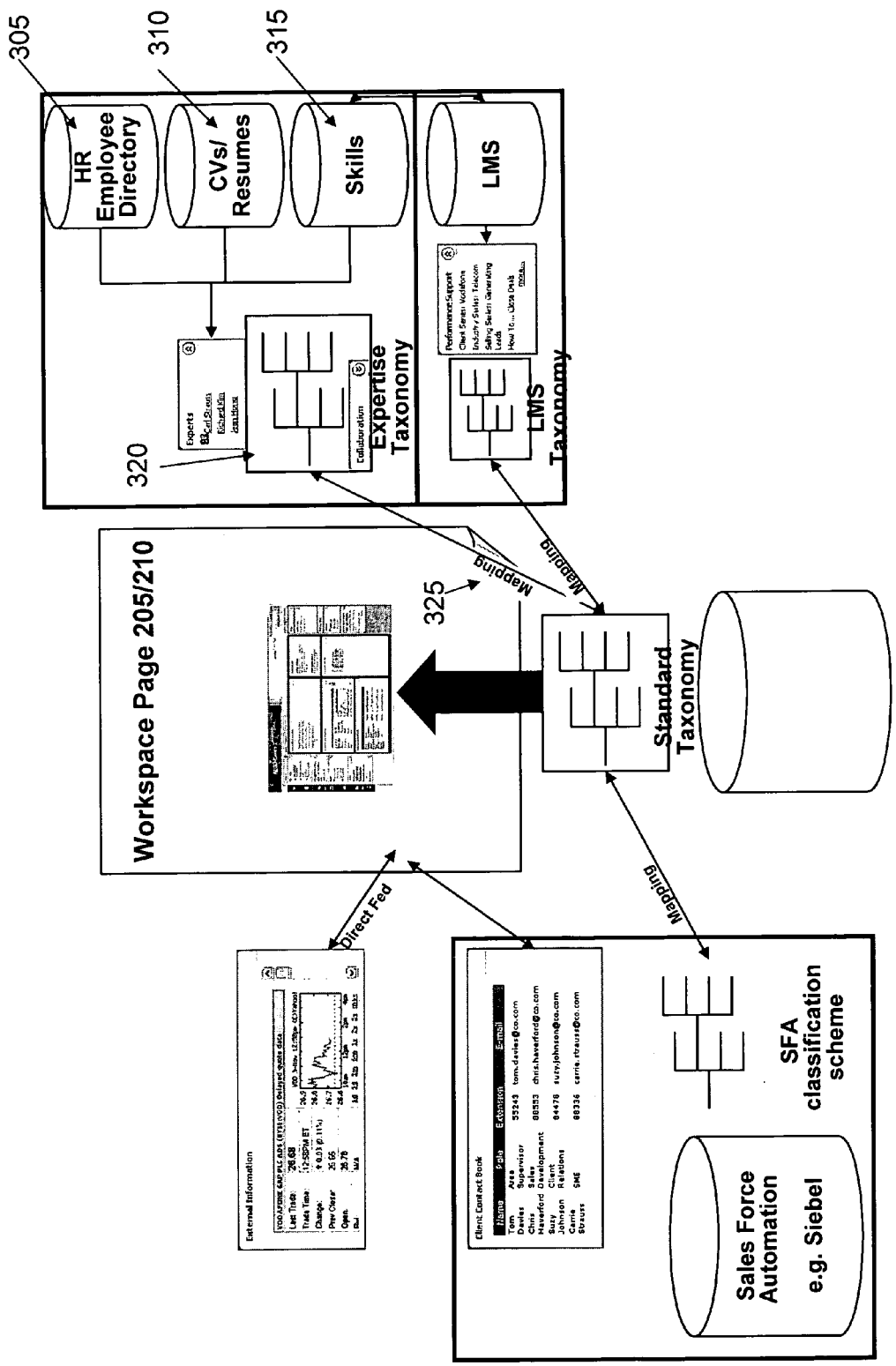
FIG. 3 is a schematic diagram illustrating a feature of the embodiment of FIG. 1.

FIG. 3 also illustrates the concept of mapping non-standard taxonomies. FIG. 3 illustrates that taxonomies exist outside of AUDRIE. For example, a company may rely on a pre-existing expertise taxonomy to structure data about its employees. AUDRIE may map this expertise taxonomy 320 to its standard taxonomy to interface with the various HR content sources 325.

Figure 4:
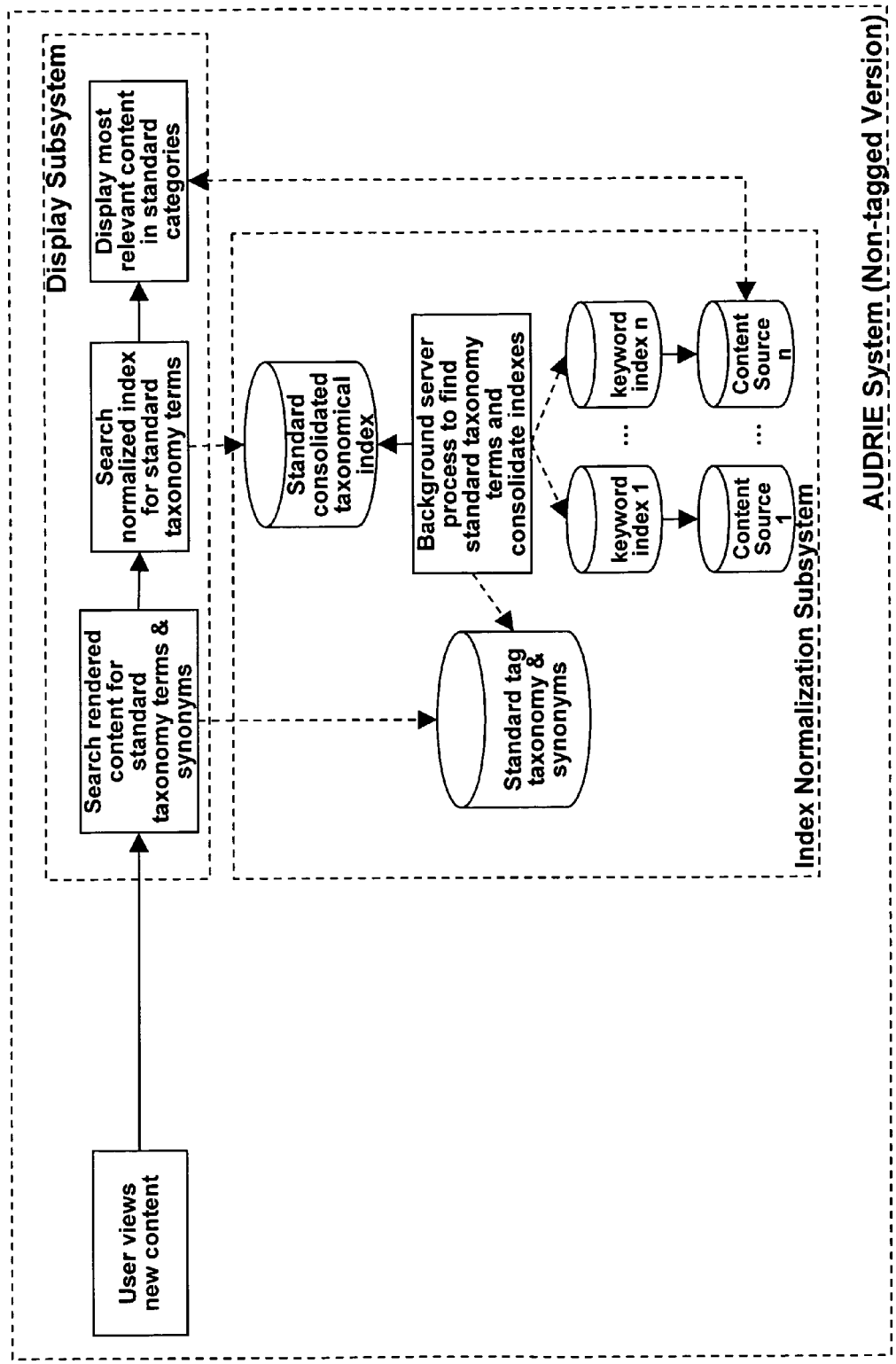
FIG. 4 is a flowchart of another embodiment of the present invention.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims. For example, the AUDRIE system described above provides for analyzing content being viewed by the user in three ways, namely, looking for standard tags in the content, looking for non-standard tags that have been mapped, and then looking for recognized terms and synonyms. One skilled in the art will recognize that the AUDRIE system can be developed in differing embodiments. For example, FIG. 4 shows a non-tagged version of AUDRIE that is also within the scope of the present invention.

What is claimed is:

1. A computer-implemented method for presenting, to a user of a computer, reference information related to content being viewed by the computer user, the computer including a processor and memory, and the method comprising steps performed by the computer of:
   identifying, by the processor, taxonomy tags and taxonomy terms in the viewed content, the step of identifying comprising:
   (a) determining whether the viewed content contains standard taxonomy tags, recognized non-standard taxonomy tags, non-recognized taxonomy tags, or no tags;
   (b) determining whether the viewed content contains standard taxonomy terms or non-standard taxonomy terms, wherein if the viewed content contains non-recognized taxonomy tags or no tags, then the viewed content is read to determine any standard taxonomy terms contained in the viewed content; and
   (c) compiling a standardized list comprising:
      ones of the determined standard taxonomy terms that are relevant to the viewed content;
      ones of the determined non-standard taxonomy terms that are relevant to the content, the determined non-standard taxonomy terms being mapped to the determined standard taxonomy terms when the determined non-standard taxonomy terms are synonyms to the determined standard taxonomy terms;
      the determined standard taxonomy tags; and
      the determined recognized non-standard taxonomy tags, the determined recognized non-standard taxonomy tags being converted to standard taxonomy tags;
   creating, by the processor, a normalized standardized taxonomy index, wherein the step of creating comprises:
   (a) locating taxonomy terms and taxonomy tags contained in a plurality of content files from a plurality of disparate content sources;
   (b) building for the plurality of content files an index of the located taxonomy terms and taxonomy tags; and
   (c) consolidating the built indices into a consolidated index stored on a database; and
   automatically displaying, by the processor, related content, based on the standardized list and the normalized standardized taxonomy index, to the computer user;

wherein the step of displaying comprises:
(a) parsing the viewed content for a plurality of taxonomy terms or tags from the standardized list;
(b) searching, unprompted by the user, the normalized standardized taxonomy index for at least one of the plurality of taxonomy terms or tags from the standardized list;
(c) retrieving related content based on the searching; and
(d) displaying the related content to the computer user.

2. The method of claim 1 further comprising:
mapping, by the processor, the taxonomy terms to standard taxonomy terms when the taxonomy terms are synonyms to standard taxonomy terms.

3. The method of claim 1, wherein a standardized tag index indexes related content from the plurality of disparate content sources.

4. A computer-implemented method for presenting, to a user of a computer, reference information from a plurality of content sources related to content being viewed by the computer user, the computer including a processor and memory, and the method comprising steps performed by the computer of:
parsing, by the processor, the viewed content for a plurality of standardized taxonomy terms, wherein if the viewed content contains non-recognized taxonomy tags or no tags, then the viewed content is parsed to determine any standard taxonomy terms contained in the viewed content;
searching, unprompted by the user, by the processor, a normalized standardized taxonomy term index for at least one of the plurality of standardized taxonomy terms for determining related content;
retrieving, by the processor, the related content; and
automatically displaying, by the processor to the computer user, the related content.

5. The method of claim 4, further comprising:
mapping, by the processor, non-standard taxonomy terms to standard taxonomy terms when the non-standard taxonomy terms are synonyms to standard taxonomy terms.

6. The method of claim 4, wherein the normalized standardized index indexes related content from a plurality of content sources.

7. The method of claim 4, wherein the step of displaying displays the related content on a display device that is also displaying the viewed content.

8. A computer-implemented method for identifying standardized taxonomy terms in content being viewed by a user of a computer, the computer including a processor and memory, and the method comprising steps performed by the computer of:
determining, by the processor, whether the viewed content contains standard taxonomy tags or recognized non-standard taxonomy tags;
compiling, by the processor, a list comprising standardized taxonomy terms relevant to the viewed content, wherein compiling comprises:
(a) parsing the viewed content for a plurality of standard taxonomy terms and non-standard taxonomy terms, wherein the non-standard taxonomy terms are synonyms of standard taxonomy terms and the plurality of standard taxonomy terms are stored in a database;
(b) standardizing a plurality of standard taxonomy tags and recognized non-standard taxonomy tags by mapping recognized non-standard taxonomy tags to standard taxonomy tags stored in a database; and
(c) reading the viewed content to determine any standard taxonomy terms contained in the viewed content if the viewed content contains non-recognized taxonomy tags or no tags;
searching, unprompted by the user, by the processor, a normalized standardized taxonomy term index for at least one of the standardized taxonomy terms for determining related content;
retrieving, by the processor, the related content; and
automatically displaying the related content, by the processor, to the user.

9. The method of claim 8, wherein the step of compiling comprises:
identifying, by the processor, a plurality of standard taxonomy terms for the viewed content by comparing words in the viewed content to standardized taxonomy terms stored in a database, wherein the standardized taxonomy terms comprise standard and non-standard taxonomy terms and the non-standard taxonomy terms are synonyms for the standard taxonomy terms.

10. The method of claim 8, further comprising:
mapping, by the processor, the non-standard taxonomy terms to standard taxonomy terms.

11. A computer-implemented method for creating a normalized standardized tag index for use in presenting, to a user of a computer, information from a plurality of sources that is related to content being viewed by the computer user, the computer including a processor and memory and the method comprising steps performed by the computer of:
locating, by the processor:
standard and non-standard taxonomy terms contained in a plurality of content files from a plurality of disparate sources, based on identified standard and non-standard taxonomy terms in the viewed content; and
standard and non-standard taxonomy tags attached to a plurality of content files from a plurality of disparate content sources, based on identified standard and non-standard taxonomy tags attached to the viewed content,
wherein if the viewed content contains non-recognized taxonomy tags or no tags, then the viewed content is read to locate any standard taxonomy terms contained in the content;
building, by the processor for the plurality of content files, an index of the located taxonomy terms and taxonomy tags;
consolidating, by the processor, the built indices into a consolidated index stored on a database;
searching, unprompted by the user, by the processor, the consolidated index for content related to the viewed content; and
automatically displaying, by the processor, content related to the viewed content.

12. The method of claim 11, wherein the step of consolidating comprises:
mapping, by the processor, one or more of the taxonomy terms to standard taxonomy terms when the one or more of the taxonomy terms are synonyms to standard taxonomy terms.

13. The method of claim 11, wherein the consolidated index indexes related content from a plurality of content sources.

* * * * *